(12) United States Patent
Tooley et al.

(10) Patent No.: US 8,132,766 B2
(45) Date of Patent: Mar. 13, 2012

(54) STRUCTRURE HAVING A MOUNTING MEANS

(75) Inventors: Jonathan Harry Tooley, Hampshire (GB); Charles Frederick Burrows, Hampshire (GB)

(73) Assignee: Croydex Limited, Andover (GB)

( * ) Notice: Subject to any disclaimer, the term of this patent is extended or adjusted under 35 U.S.C. 154(b) by 767 days.

(21) Appl. No.: 11/921,408

(22) PCT Filed: May 26, 2006

(86) PCT No.: PCT/GB2006/001919
§ 371 (c)(1),
(2), (4) Date: Oct. 6, 2008

(87) PCT Pub. No.: WO2006/129067
PCT Pub. Date: Dec. 7, 2006

(65) Prior Publication Data
US 2009/0206215 A1    Aug. 20, 2009

(30) Foreign Application Priority Data

Jun. 1, 2005   (GB) .................................... 0511175.2

(51) Int. Cl.
*A45D 42/14* (2006.01)
*F16B 47/00* (2006.01)
(52) U.S. Cl. ............... 248/206.2; 248/205.5; 248/206.3; 248/683
(58) Field of Classification Search ............... 248/206.2, 248/205.5, 206.3, 683
See application file for complete search history.

(56) References Cited

U.S. PATENT DOCUMENTS

| | | |
|---|---|---|
| 483,635 A | 10/1892 | Prince, Jr. |
| 488,963 A | 12/1892 | Carpenter |
| 769,904 A | 9/1904 | Hunt |
| 952,495 A | 3/1910 | Austin |
| 975,271 A | 11/1910 | Murray |

(Continued)

FOREIGN PATENT DOCUMENTS

DE    1166894    10/1969

(Continued)

*Primary Examiner* — Amy J Sterling
(74) *Attorney, Agent, or Firm* — Dickstein Shapiro LLP

(57) ABSTRACT

In order to provide a structure for removable attachment to a substantially vertical surface for example of glass, glazed tiles or metal, the structure has a mounting means comprising: suction means (1) for sealingly contacting a surface, pulling means (2) being attached to the suction means (1) for drawing a part of the suction means (1) away from the surface, so that a partial vacuum is created between the suction means (1) and the surface. There is a substantially helical or wedge shaped surface on the pulling means (2) engaged with a corresponding substantially helical or wedge shaped surface of a rotatable member (13), whereby rotation of the rotatable member (13) draws the pulling means (2) and respective part of the suction means (1) away from the surface. An intermediate member (5) is provided for engaging a sealing part of the suction means (1), the intermediate member (5) supporting the rotatable member (13). The structure comprises a structural member (10) mounted in or on the intermediate member (5), so that the structural member (10) is not gripped by the intermediate member (5) or rotatable member (13). At least part of the rotatable member extends beyond a part of the intermediate member which is adjacent to the rotatable member. There is a friction reducing member (11) between the rotatable member and the intermediate member. A clip means, possibly also acting as a friction reducing member (11), can be provided for holding the structural member 18 temporarily in position on the intermediate member 5 during assembly.

18 Claims, 3 Drawing Sheets

U.S. PATENT DOCUMENTS

| | | | |
|---|---|---|---|
| 1,015,347 A | 1/1912 | Schnaus | |
| 2,370,938 A | 3/1945 | Cohen | |
| 3,724,131 A | 4/1973 | Schnormeier | |
| 3,747,170 A | 7/1973 | Kieves | |
| 3,904,164 A | 9/1975 | Wheeler et al. | |
| 4,842,912 A | 6/1989 | Hutter, III | |
| 4,934,640 A | 6/1990 | Bichon | |
| 5,087,005 A | 2/1992 | Holoff et al. | |
| 5,630,517 A | 5/1997 | Maznik | |
| 6,045,111 A | 4/2000 | Hsieh | |
| 6,193,197 B1 * | 2/2001 | Lian | 248/206.2 |
| 6,446,825 B1 | 9/2002 | Godoy | |
| 6,478,271 B1 | 11/2002 | Mulholland | |
| 6,669,033 B1 | 12/2003 | Lian et al. | |
| 6,896,228 B1 * | 5/2005 | Lu | 248/205.8 |
| 7,243,806 B2 * | 7/2007 | Kwok | 211/105.3 |
| 2002/0020067 A1 | 2/2002 | Silver et al. | |
| 2002/0164208 A1 | 11/2002 | Koellner | |
| 2002/0175250 A1 | 11/2002 | Lian | |
| 2005/0044673 A1 | 3/2005 | Huang | |
| 2006/0138292 A1 * | 6/2006 | Yang | 248/206.3 |

FOREIGN PATENT DOCUMENTS

| | | |
|---|---|---|
| DE | 1 680 278 | 9/1971 |
| DE | 2 410 643 | 9/1974 |
| DE | 75 03 829 | 7/1975 |
| DE | 75 06 197 | 7/1975 |
| DE | 87 04 619 | 9/1987 |
| DE | 93 15 936 | 3/1994 |
| DE | 94 09 430 | 10/1994 |
| DE | 200 16 433 | 1/2001 |
| DE | 201 07 693 U1 | 8/2001 |
| DE | 201 07 697 U1 | 8/2001 |
| DE | 201 16 263 U1 | 7/2002 |
| DE | 101 21 983 A1 | 11/2002 |
| DE | 203 02 214 U1 | 7/2003 |
| DE | 203 02 216 U1 | 7/2003 |
| DE | 203 02 218 U1 | 7/2004 |
| DE | 20 2005 001 085 U1 | 5/2005 |
| EP | 0 915 263 A1 | 5/1999 |
| EP | 1 338 808 A1 | 8/2003 |
| ES | 2 088 306 T3 | 8/1996 |
| FR | 2 161 306 | 7/1973 |
| FR | 2 347 563 | 12/1977 |
| GB | 796904 | 6/1958 |
| GB | 975271 | 11/1964 |
| GB | 2 185 067 A | 7/1987 |
| GB | 2 245 638 A | 1/1992 |
| GB | 2 262 307 A | 6/1993 |
| GB | 2 275 723 A | 9/1994 |
| GB | 2 293 622 A | 4/1996 |
| GB | 2 337 074 A | 11/1999 |
| GB | 2 342 382 A | 4/2000 |
| GB | 2 373 019 | 9/2002 |
| GB | 2 373 019 A | 9/2002 |
| JP | 2001-214484 | 8/2001 |
| TW | 563897 | 11/2003 |
| TW | 253772 | 4/2006 |
| WO | WO 90/15565 | 12/1990 |
| WO | WO 93/19304 | 9/1993 |
| WO | WO 96/27087 | 9/1996 |

* cited by examiner

STRUCTRURE HAVING A MOUNTING MEANS

The present invention relates to a structure having a mounting means for removable attachment to a surface. The present invention is particularly suitable for attachment to smooth surfaces, such as glazed tiles, plastic, steel or glass, such as are commonly found in kitchens and bathrooms.

Mounting means for removable attachment to smooth surfaces in kitchens and bathrooms are well known. They typically comprise a suction means for contacting a smooth surface, in the form of a suction pad. British patent application no. GB2373019 discloses such a mounting means for removable attachment to a surface. It comprises a suction means for sealingly contacting a surface and pulling means attached to the suction means for drawing a part of the suction means away from the surface so that a partial vacuum is created between the suctions means and the surface. The pulling means comprises a substantially helical surface engaged with a corresponding substantially helical surface of a rotatable member. Rotation of the rotatable member causes the helical surfaces to move over one another, thereby drawing the pulling means and respective part of the suction means away from the surface. There is an intermediate member for engaging the sealing part of the suction means. The intermediate member supports the rotatable member at a substantially fixed distance from the surface in use. There is a contact means (which is separate from the intermediate member) which extends beyond the suction means and which is for contacting the surface when in use, so that twisting moments caused by putting loads on the mounting means can be transferred directly to the wall surface without going through the intermediate member and therefore without tending to pull parts of the suctions means away from the wall.

The rotatable member may have a boss on which structural members can be supported.

This is a successful and effective design of mounting means, but a number of problems have been encountered.

In the first place, a very strong grip can only be obtained if there is a powerful force on the pulling means. However, such forces tend to make operation of the mounting means difficult. Further, for maximum stability, it is desired that any structural member mounted using the mounting means should be held as close to the wall as possible and this is difficult with the existing design.

It is desired that the mounting means will not be accidentally dislodged by sudden loads or impacts applied to a structure which is fixed using the mounting means.

It is desired to make the structure easy to assemble.

The present inventor has realised that a structural member can be held relatively close to the wall by mounting it in the intermediate member, rather than on the outside of the rotatable member. Further, the structure can be protected from shock loads by mounting the structural member relatively loosely in the intermediate member.

Accordingly, in a first aspect, the present invention provides a structure having a mounting means for removable attachment to a substantially vertical surface, wherein the mounting means comprises:

suction means for sealingly contacting a surface, pulling means being attached to the suction means for drawing a part of the suction means away from the surface, so that a partial vacuum is created between the suction means and the surface, there being a substantially helical or wedge shaped surface engaged with a corresponding substantially helical or wedge shaped surface of a rotatable member, whereby rotation of the rotatable member draws the pulling means and respective parts of the suction means away from the surface, and an intermediate member for engaging a sealing part of the suction means, the intermediate member supporting the rotatable member, wherein the structure comprises a structural member mounted in or on the intermediate member, so that the structural member is not gripped by the intermediate member or rotatable member.

The present inventor has further realised that the operation of the mounting means can be made easier if at least part of the rotatable member is of larger dimension than a part of the intermediate member adjacent to it, because of the greater leverage obtained. Further, this arrangement can be retained even when the structural member is mounted in the intermediate member. The user's fingers can still operate the rotatable member without getting caught in the structural member.

Accordingly, in a second aspect, the present invention provides a structure having a mounting means for removable attachment to a substantially vertical surface, the mounting means comprising:

suction means for sealingly contacting a surface, pulling means being attached to the suction means for drawing a part of the suction means away from the surface so that a partial vacuum is created between the suction means and the surface, there being a substantial helical or wedge shaped surface engaged with a corresponding substantially helical or wedge shaped surface of a rotatable member, whereby rotation of the rotatable member draws the pulling means and respective part of the suction means away from the surface, and an intermediate member for engaging a sealing part of the suction means, the intermediate member supporting the rotatable member, wherein the structure comprises a structural member mounted in or on the intermediate member, at least part of the rotatable member extending beyond a part of the intermediate member which is adjacent to the rotatable member in a dimension normal to the axis of rotation of the rotatable member.

The present inventor has further realised that operation can be made easier by inserting a friction reducing member such as a washer between the rotatable member and the intermediate member. This can be obtained, surprisingly, without introducing flexibility or instability into the design which could affect its operation.

Accordingly, in a third aspect, there is provided a mounting means for removable attachment to a substantially vertical surface, comprising:

suction means for sealingly contacting a surface, pulling means being attached to the suction means for drawing a part of the suction means away from the surface so that a partial vacuum is created between the suction means and the surface, there being a substantially helical or wedge shaped surface engaged with a corresponding substantially helical or wedge shape surface of a rotatable member, whereby rotation of the rotatable member draws the pulling means and respective part of the suction means away from the surface, and an intermediate member, for engaging the sealing part of the suction means, the intermediate member supporting the rotatable member, wherein there is a friction reducing member between the rotatable member and the intermediate member.

The present inventor has further realised that, when the structure comprises a structural member and a mounting means, the mounting means comprising a rotatable member and an intermediate member which are separable during assembly and which hold between them the structural member, assembly can be complicated as the user will have to support each of intermediate member, the structural member and the rotatable member, which can be difficult with only two hands. The inventor has realised that a clip means can be provided for temporarily holding the structural member with respect to the one of the rotatable member or intermediate member during assembly, before the intermediate member and rotatable member are sufficiently engaged to provide full support for the structural member.

Accordingly, in a fourth aspect there is provided a structure having a structural member and a mounting means for removable attachment to a substantially vertical surface, the mounting means comprising:

suction means for sealingly contacting a surface, pulling means being attached to the suction means for drawing a part of the suction means away from the surface so that a partial vacuum is created between the suction means and the surface, there being a substantially helical or wedge shaped surface engaged with a corresponding substantially helical or wedge shaped surface of a rotatable member, whereby rotation of the rotatable member draws the pulling means and respective part of the suction means away from the surface, and an intermediate member for engaging the sealing part of the suction means, the intermediate member supporting the rotatable member, wherein, in use, the structural member is supported by the intermediate member and the rotatable member, clip means being provided which is releasably engageable with at least one of the rotatable member and intermediate member for holding the structural member thereto during assembly.

Preferably, the first, second, third and fourth aspects of the invention may be combined together. In a structure according to the first, second or fourth aspect of the invention, a mounting means according to the third aspect of the invention may be used. The first aspect of the invention may have a structural member mounted on the intermediate member, at least part of the rotatable member extending beyond a part of the intermediate member which is adjacent to the rotatable member in a dimension normal to the axis of rotation of the rotatable member.

In the structure of the first or second aspect of the invention, the clip means according to the fourth aspect of the invention may also be present. Any three out of the four aspects may be combined together. Preferably, all four aspects occur together.

Preferred and optional features of the present invention will be further described below. Unless otherwise specified, these features apply to all aspects of the invention.

The mounting means of the present invention can be used for engagement with any suitable surface. Preferably, it is for engagement with a smooth surface. Preferably, the surface is of the type found in kitchens and bathrooms, for example gloss painted surfaces, metal surfaces, such as aluminium or steel, glass or glazed surfaces such as tiles or plastic such as perspex or PVC.

The suction means of the invention preferably comprises a material which forms a good seal with a smooth surface and is preferably a thermoplastic material example PVC or a silicone composition. The suction means maybe of any suitable shape, but is preferably substantially circular in plan. It may have a slightly domed profile. Preferably, the pulling means is attached to the suction means substantially in the centre thereof.

The sealing part of the suction means comprises that portion of the suction means which includes a surface which forms a sealing contact with the smooth surface in use.

The suction means of the invention should form a sealing contact with a smooth surface around a closed figure, for example a circle. The pulling means should of course contact the suction means within the space defined by the closed figure.

The pulling means of the invention may be integrally formed with the suction means, however, it is sometimes found that the suction means is formed of a material which is not suitable for forming a pulling means, being too flexible. The pulling means may then be sealingly engaged with the suction means, for example by a way of adhesive or by a mechanical fit.

The suction means preferably comprises a sealing surface, for contacting a surface to which the mounting is to be fixed and a second surface, opposed to the sealing surface. The second surface preferably comprises at least one structure for engaging the intermediate member, so that the intermediate member can be fixed with respect to the suction means. For example, the structure may comprise a ridge. Preferably, it is a substantially continuously extending ridge extending around the suction means. Preferably, it extends in the region of the sealing part.

The rotatable member of the invention may be made of any suitable shape, but is preferable substantially circular in plan. It is suitably formed of a relatively rigid material, such as metal or thermoplastic. The metal may comprise aluminium or aluminium alloy. It may be cast and/or machined. It may comprise a thermoplastic material, for example polypropylene or polyethylene. The rotatable member is suitably of a diameter of 2 cm or more, preferably 3 cm or more and most preferably 4 cm or more.

The rotatable member is preferably of a generally circular configuration.

The rotatable member preferably comprises at least one bearing surface for sliding over the intermediate member. The bearing surface preferably engages the intermediate surface through a friction reducing member such as a washer, as in the third aspect of the invention. The bearing surface may engage the intermediate surface through the clip means, which may also function as a friction reducing member. The friction reducing member such as a washer may be formed of any suitable material, preferably, it is formed of a synthetic polymeric material for example an acetate based polymeric material. It should be able to withstand the loads applied during use. The friction reducing member may have any suitable shape but is preferably in the form of a laminar material, which is of thickness less than 15 mm, preferably less than 10 mm. It is preferably substantially circular in plan.

The friction-reducing member may be fixed to the intermediate member or fixed to the rotatable member. It may be permanently fixed or releasably fixed. For example, it may have a screw threaded bore which is screwed onto the pulling means. There may be resilient structures formed on one of the friction reducing member and the member to which it is fixed, for example at least one hook for engaging at least one latch formation. Preferably, the friction reducing member has a resilient formation for engaging in a central hole of the intermediate member. These arrangements may allow the friction-reducing member to act as a clip means according to the fourth aspect of the invention.

The bearing surface is preferably located at a relatively large radius. Preferably, it is located at a radius at least 1 cm and preferably at least 1.5 cm. It may be coincident with the outer rim of the rotatable member. Preferably, however, it is located at a position displaced radially inwardly from the outer rim of the rotatable member by at least 1 mm and preferably at least 2 mm. This is so that the bearing part contacts the intermediate member at a part of the intermediate member which is also displaced inwardly from its edge and which is accordingly stable and strong.

The bearing surface preferably comprises a substantially closed annular surface. The bearing surface may be a continuous formation with the outer rim of the rotatable member or it may be displaced away from the outer rim of the rotatable member.

The intermediate member is suitably made of a metal or thermoplastic material preferably, it is formed of a metal such as aluminium or aluminium alloy. It may be cast and/or machined. It may be formed of thermoplastic material such as polyethylene or polypropylene.

The intermediate member contacts the suction means in the seating part thereof, so that the suction means will be firmly pushed into contact with the surface to improve the seal.

Preferably, the intermediate member comprises at least one formation for engaging a corresponding formation on the sealing means (as discussed above) to stably locate the intermediate member with respect to the suction means. For example, the intermediate member may comprise an annular ridge.

Preferably, the pulling means comprises a substantially helical or wedge shaped surface for engaging the substantially helical or wedge shaped surface of the rotatable member. Preferably it which projects through the intermediate member. The respective substantially helical surfaces may be of any suitable configuration. They may comprise cam surfaces which extend over less than a full circle or they may comprise screw threads which extend over more than a full circle. They may comprise wedge surfaces, the upper faces of which are substantially straight or flat. The screw threads are particularly preferred as they allow the degree of movement of the pulling means to be variable. Preferably, the pitch of screw thread is relatively close, making more than four full turns in a length equal to the diameter, preferably more than six full turns. This allows particularly fine control of the extension of the pulling means and low turning forces.

Locking means may be provided for fixing the rotatable member in a position corresponding to the desired extension of the pulling means. However, where a screw thread is used, it may not be necessary to provide locking means, the screw threads themselves providing sufficient resistance to rotation because of friction.

Preferably, the pulling means comprises a screw threaded member engaging a screw threaded bushing in the rotatable member. Alternatively, pulling means may comprise a screw threaded bushing into which a substantially screw threaded part of the rotatable member is engaged.

The travel of the substantially helical surface should be sufficient to allow a sufficiently strong partial vacuum to develop. Preferably, the distance of travel will be in the range of 1.0-20 mm, more preferably 1.5-5.0 mm.

In the present invention, the contact with the surface is preferably provided by the suction means only or by the suction means and a part of the structure which is mounted on the mounting means. Preferably, the intermediate member and the rotatable member do not contact the surface.

The mounting means of the invention may be of any suitable size. The suction means, intermediate member and rotatable member may be each be circular and each of diameter up to about 10 cm, more preferably up to about 8 cm being most preferably around 3-5 cm in diameter.

The suction means may provide a contact area in the range 20-80 mm$^2$, more preferably 20-40 mm$^2$.

According to the first and second aspect of the invention, the structural member is mounted in the intermediate member. Any suitable structure may be provided which does not grip the structural member, so that it can move. The structural member must be able to move in at least one dimension. There must be at least one degree of freedom of movement whereby shocks may be absorbed.

If the structural member is only able to move in one dimension, it is preferable that that dimension is not parallel to the vertical surface or, equivalently, the plane of contact of the suction means. This is because the forces most likely to dislodge the device from the vertical surface extend in a direction which is not parallel to the surface and it is desired to be able to move to accommodate such shocks.

The structural member is preferably mounted in or on a part of the immediate member which, in use, is close to the vertical surface, or adjacent the vertical surface.

By "close" it is meant that the part of the intermediate member to which the structural member is attached is closer to the vertical surface, in use than the outermost part of the rotatable member. Preferably, in use, all or part of the weight of the structural member is transferred directly to the intermediate member. Preferably, the weight is not transmitted through the rotatable member.

The whole weight of the structural member may be taken by the intermediate member. However, it is also possible that, in use, another part of the structural member will contact the vertical surface so that a part of the weight of the structural member may be supported by reaction forces (suitably frictional forces) at the vertical surface. Preferably, the whole weight of the structural member is taken by the intermediate member and the vertical surface together.

The structural member is preferably rigid. Preferably, it is of the sufficient stiffness to be able to carry the weight of at least of a conventional bar of soap or a toilet roll.

The structural member may make resilient contact with the intermediate member, as long as it is capable of being displaced under light loads for example loads in excess of 1 gram force more preferably in excess of 5 gram force.

The structural member may be engaged with the intermediate member by an engagement portion which is received in an engagement recess of the intermediate member. The engagement recess of the intermediate member is preferably larger than the engagement portion of the structural member in at least one dimension.

There may be more than one engagement member engaged with one or more engagement recesses of the intermediate member, as long as no engagement portion is rigidly gripped.

The engagement portion may comprise a suitable structure, for example stub or arm sections. The engagement portion may extend into the engagement recess of the intermediate member and terminate in the engagement recess, or it may extend through the engagement recess. In a preferred embodiment, the engagement recess is a continuously extending recess which extends through the intermediate member. This can allow the engagement structure to be slidably mounted on the intermediate member.

The structural member may comprise any suitable structure. It may comprise a structural member for engaging other structures. However, it is particularly preferred that it comprises at least one of a toilet roll holder arm, a structural component on a shelf, basket or box, or a towel holder.

A stop member may be provided on one of the engagement portion and engagement recess, engagable with a stop surface of the other component. This can prevent the structural member being disengaged unintentionally from the intermediate member.

In a preferred embodiment, the structural member comprises a curved edge of a basket, the engagement recess being of sufficient size that it will engage with the curved edge and allow the curved edge to slide through the engagement recess. In this way, a basket can be mounted adjacent to a corner between two adjacent vertical walls, the position of the mounting member being adjusted along the curved edge of the basket to optimise the support.

The engagement recess of the intermediate member may be closed on at least one face by at least one of a friction reducing member, a clip means or the rotatable member. The friction reducing member may be releasably fixed to intermediate member as described above. The friction reducing member which is releasably fixed to the intermediate member may provide a clip means. This allows the entire assembly to be separated into components which can then be reassembled when required.

In a preferred embodiment, the present invention provides a kit of parts, comprising at least one mounting means according to the invention and at least two structural members, each of which is engageable with the intermediate member to provide a mounting means according to the present invention. In this way, a user can select the desired structure and assemble the components appropriately.

The kit may further comprise a plurality of different intermediate members, each of which is engageable with a different design of structural member.

In a further preferred embodiment, the structural member comprises an engagement portion which is received in an engagement recess formed in the intermediate member, at least one face of the engagement recess being closed by a washer, the washer comprising a screw thread so that it is engageable with the screw thread of the pulling means. In this way, the washer can be screwed on to the pulling means to hold the engagement portion of the structural member in the engagement recess before the rotatable member is put in position.

The engagement portion may comprise a rod of diameter in the range 3-10 mm and the engagement recess may comprise a slot of a diameter which is slightly larger, being for example 2-5 mm larger than the engagement portion.

It is found that the mounting means of the present invention can support loads of 9-10 kilograms, which extend for a maximum extent of up to 100 mm preferably up to 80 mm from a wall, in use.

The clip means of the fourth aspect of the invention may comprise any suitable design. Preferably, it is for temporarily fixing the structural member to the intermediate member. It may be formed of any suitable material, for example a resiliently deformable metal formation or a resiliently deformable synthetic material, such as thermoplastic. Preferably, the clip means comprises a contact surface, for holding the structural member with respect to the intermediate member or rotatable member and a resilient grip, for engaging a part of the intermediate member or rotatable member. It is particularly preferred that the intermediate member should comprise a central hole, through which the pulling means of the suction means projects, the engaging part of the clip means engaging in the hole. Preferably, the clip means comprises a central hole through which, in use, the pulling means will project, a plurality of teeth being formed around the hole, for engaging in the hole of the intermediate member. Preferably, the teeth comprise undercut formations for forming a snap fit engagement with the hole on the intermediate member.

The present invention will be described further by way of example only with reference to the accompanying drawings, in which:

DETAILED DESCRIPTION OF THE DRAWINGS

Figure 1:
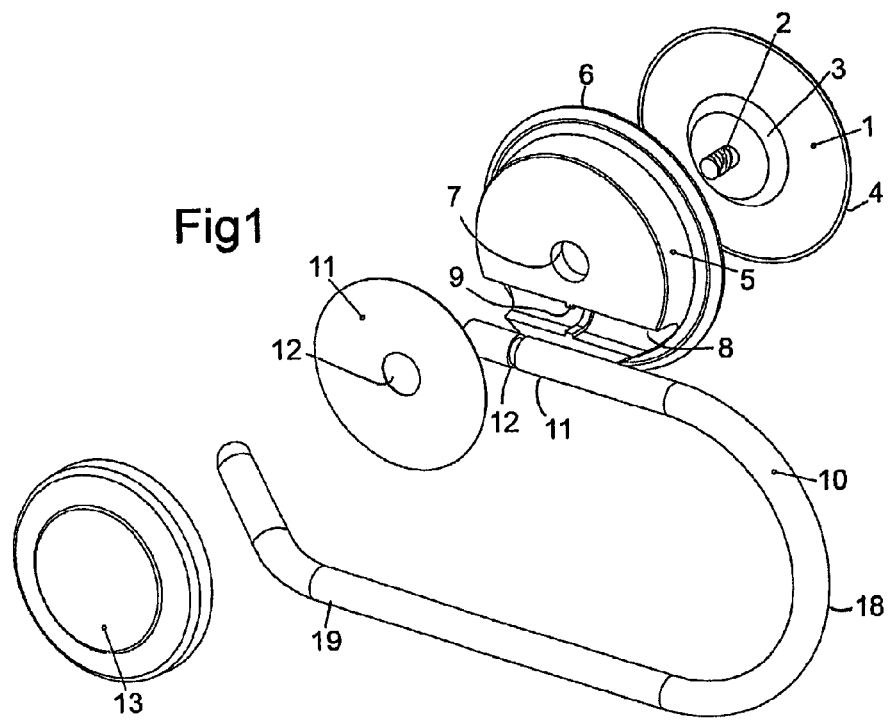
FIG. 1 is a sketch isometric view of a structure according to the invention, in a disassembled condition.

FIG. 1 shows a structure according to the first, second and third aspects of the present invention.

It comprises a suction means 1 comprising a silicone rubber disc having a pulling means 2 projecting from the center. The suction means comprises a slight raised portion 3 in the middle which forms a secure connection between the pulling means 2 and the suction means 1. The pulling means 2 comprises a screw threaded shaft. The suction means 1 further comprises a raised ridge 4 around its perimeter.

There is an intermediate member 5 of cast aluminium alloy. It comprises a depending skirt 6 which has, on its underside, a ridge, (not shown) which is configured to exactly fit and engage the ridge 4 formed around the suction means 1. There is a central bore 7 through which the pulling means 2 of the suction means projects and which does not engage the pulling means. There is an engagement recess in the form of a longitudinally extending slot 8 which extends from one end of the intermediate member 5 to the other. It is of generally cylindrical form with one face removed. It comprises a part—arc shaped stop member 9 forming a stop. The structural member 10 in FIG. 1 comprises a toilet roll holder arm which is formed of stainless steel rod, the arm having a twisted U-shape. It comprises an engagement portion 11 which is of tubular shape of a diameter smaller than the diameter of the engagement recess 8. It comprises a stop surface 12 for engaging the stop 9 of the engagement recess 8, so that when in position, the arm 10 cannot be removed in the axial direction from the engagement slot 8.

A washer of polyacyrylate material is provided. The washer 11 comprises a central bore 12 which, in the embodiment shown in FIG. 1, fits over the pulling means 2 which extends through the bore 7 of the intermediate member 5 and does not engage the pulling means 2.

Figure 2:
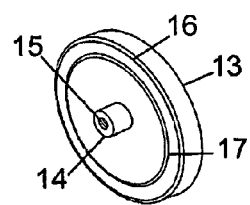
FIG. 2 is a sketch isometric view of the underside of the rotatable member shown in FIG. 1.

There is a rotatable member 13 of a generally disc shape. The outer side of the rotatable member 13 is finished in contours for aesthetic appeal. The underside of the rotatable member is shown in FIG. 2 and comprises a boss 14 having a screw threaded bore 15 which is engageable with the pulling means 2 of the suction means 1. The outer periphery of the underside of the rotatable member 13 has an outer rim 16 and inner bearing surface 17 which is displaced by about 2 mm from the rim 16.

Figure 3:
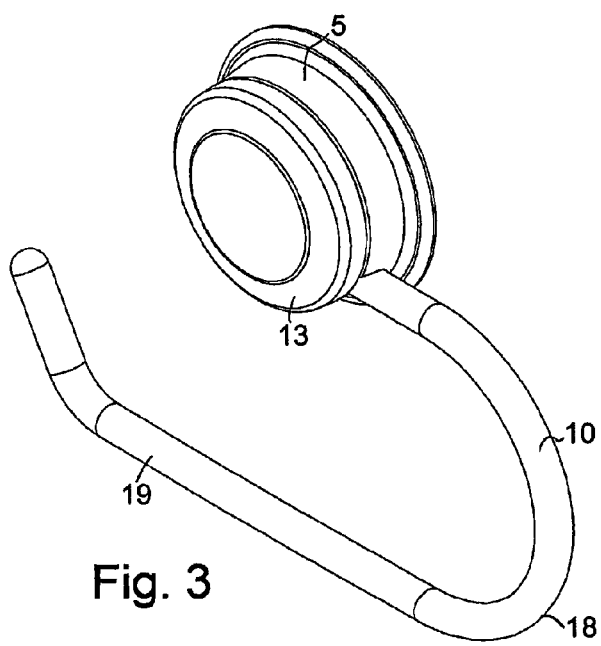
FIG. 3 is a sketch isometric view of the structure of FIG. 1, when assembled.

FIG. 3 shows the mounting means of the present invention assembled. The suction means is completely covered by the intermediate member 5 which thereby protects it. The rotatable member 13 is shown in position. The outer diameter of the rotatable member 13 is very slightly larger than the outer diameter of the top of the intermediate member 5 which is adjacent to the rotatable member. In this way, a user's fingers will naturally grip the exterior surface of the rotatable member and will not catch on adjacent parts of the intermediate member 5. It can be seen the structural member 10 is held loosely in a configuration in which it projects forwardly from the intermediate member 5.

In use, the mounting means of the present invention is placed, with the components assembled as shown in FIG. 3 with the suction member engaging a wall.

The wall should have a smooth surface, for example being formed of glass, ceramic gloss paint or metal. The mounting means is pushed firmly into contact with the surface to obtain an initial grip then the user rotates the rotatable member 13. As a result, the screw thread 15 moves over the screw thread 2 of the pulling means, drawing the pulling means outward away from the wall. As a result, the central part of the suction means is pulled away from the wall to create a partial vacuum between the suction means of the wall, whereby a force is generated which the holds the mounting means in place. The structural member 10 will tend to rotate so that an inward portion 17 of the arm 10 will rest against the wall with the outer portion 19 protruding from it.

According to the third aspect of the invention, the washer 11 reduces the friction between the rotatable member and the intermediate member 5. It also prevents scratching of surfaces between these two members.

According to the first aspect of invention, the arm 10 is held relatively loosely in the intermediate member so that any shock loads applied to the arm can be easily absorbed without applying twisting force to the mounting means.

Figure 4:
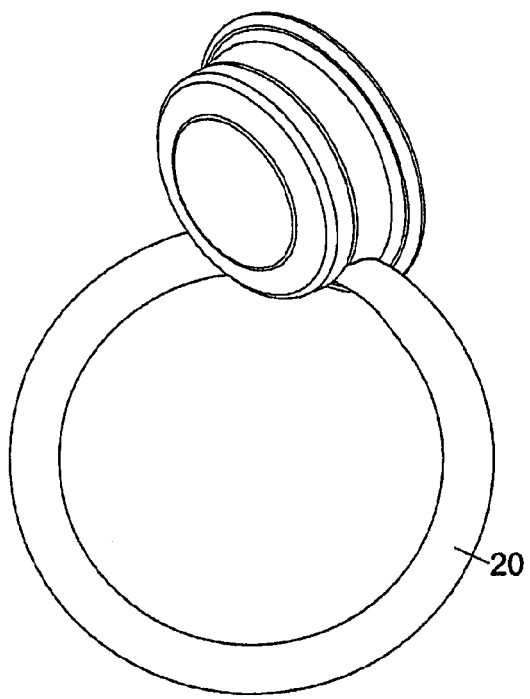
FIG. 4 is a sketch isometric view of a further embodiment of structure according to the invention, comprising a different structural member.

FIG. 4 shows a further embodiment of structure according to the present invention in which the suction means, intermediate member, rotatable member and washer are exactly as shown in FIG. 1 but the structural member comprises a substantially circular towel ring 20. The engagement portion of the towel ring will comprise a substantially tubular section with a stop slot exactly as shown for the arm 10 in FIG. 1.

Figure 5:
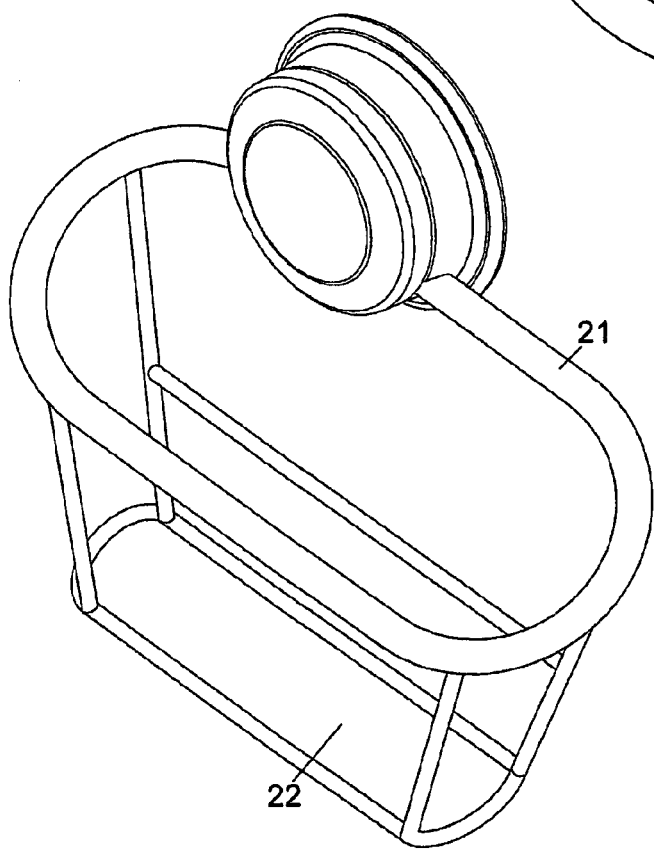
FIG. 5 is a sketch isometric view of yet a further embodiment of the structure according to the invention including a third embodiment of structural member.

FIG. 5 shows a third embodiment of structure according to the present invention in which the mounting means comprising suction means, intermediate member, washer and rotatable member is exactly as shown in FIG. 1 but the structural member comprises an upper circular section rim 21 of a basket 22 for containing articles for example for use in the bathroom. In this case, the circular suction rim 21 is configured so that it has no stop slot corresponding to the stop slot 12 shown in FIG. 1. Accordingly, it can slide along the recess 8. In this way, the mounting means can be fixed to a wall adjacent to corner with the basket pushed into the corner at any suitable position.

Figure 6:
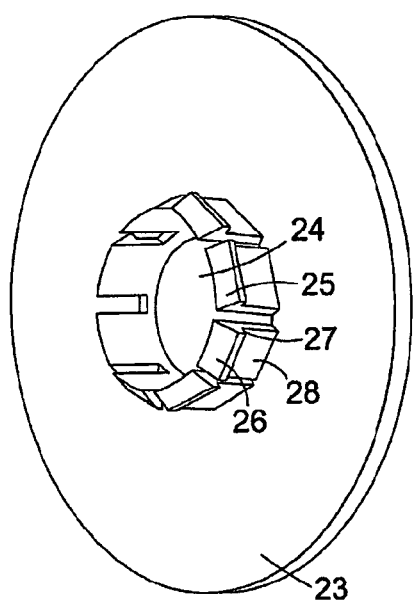
FIG. 6 is sketch isometric view of a combined friction reducing member and clip means according to the fourth aspect of the invention.

FIG. 6 shows a sketch isometric view of a clip means, according to the fourth aspect of the invention. The clip means comprises a disk 23 and a central hole 24, through which the pulling means will project, in use.

The hole is surrounded by eight resilient teeth 25. Each tooth comprises a wedge shaped leading section 26 with an undercut 27 and a stem 28. In use, the clip means of FIG. 6 can be used as the friction reducing member 11 of FIG. 1. It can perform exactly the same friction reducing function if it is made of suitable thermoplastic material. The teeth 25 are configured so that, when the clip means is pushed into engagement with the hole 7 of the intermediate member 5, the wedge section 26 ride smoothly into the hole. The stems 28 are of such a length that the teeth 25 can project all the way through the thickness of the hole 7, with the undercuts 27 clipping behind the rear surface of the intermediate member 5. In this way, the clip means will be sufficient to hold the structural member, for example 10, in position during assembly. The clip means is formed of thermoplastic material with sufficient stiffness to hold the weight of the structural member during assembly. This will make assembly of the whole mounting means easy and convenient.

Figure 7:
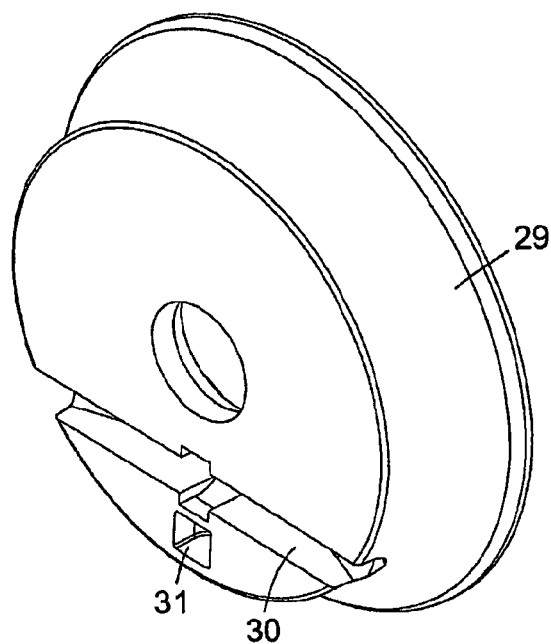
FIG. 7 is an isometric view of an intermediate member according to a further embodiment.

FIG. 7 shows an embodiment of the intermediate member 29 suitable for use with the structural member 21 shown in FIG. 5. It comprises a slot 30, the base of which has an arc shaped profile so that the circular parts of the structural—21 can ride smoothly along the slot 30, allowing the mounting means to be placed at any desired position on the structural member. A lightening hole 31 is provided to reduce the weight of the structure.

Figure 8:
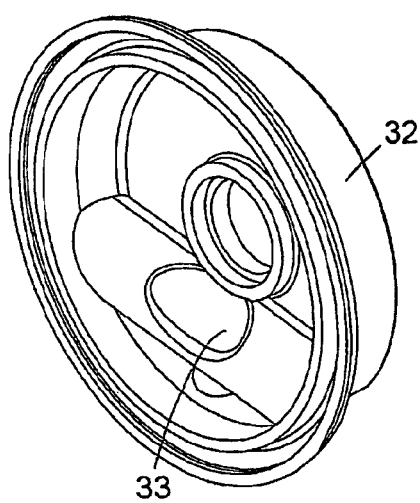
FIG. 8 is a sketch isometric view of the rear of the further embodiment of intermediate member.

FIG. 8 shows a rear view of an intermediate member 32. This design may be applied to the intermediate member shown in FIG. 1 or FIG. 7. A cutaway portion 33 is provided in the side of the formation which, on the outside of the intermediate member, defines the engaging means for the structural member. This is in order to allow the suction means to sit comfortably under the intermediate member 32.

Figure 9:
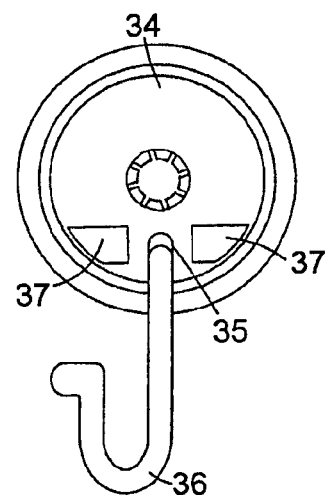
FIG. 9 is a sketch plan view of a yet further embodiment of intermediate member, engaged with the clip means of FIG. 6 and a structural member in the form of a hook.

FIG. 9 shows a yet further embodiment of intermediate member 34. It is shown engaged with the clip means of FIG. 6. It can be seen that it has a single hole 35 for engaging the stub of a hook shaped structural member 36. Lightening holes 37 are provided to reduce the weight of the formation. It can be seen that the hook is held temporarily so that the intermediate member 34 can be placed position over a suction member 13 with the pulling means 15 projecting through the central hole where it can be engaged with a rotatable member 13 in a simple straight-forward manner.

The present invention has been described above purely by way of example and modifications can be made within the spirit of the invention which extends to equivalents of the features described. The invention also consists in any individual features described or implicit herein or shown or implicit in the drawings or any combination of any such features or any generalisation of any such features or combination.

The invention claimed is:

1. A structure having a mounting means for removable attachment to a substantially vertical surface, wherein the mounting means comprises:
   suction means for sealingly contacting a surface, pulling means being attached to the suction means for drawing a part of the suction means away from the surface, so that a partial vacuum is created between the suction means and the surface, there being a substantially helical or wedge shaped surface engaged with a corresponding substantially helical or wedge shaped surface of a rotatable member, whereby rotation of the rotatable member draws the pulling means and respective parts of the suction means away from the surface, and an intermediate member for engaging a sealing part of the suction means, the intermediate member supporting the rotatable member, wherein the structure comprises a structural member mounted in or on the intermediate member, so that the structural member is not gripped by the intermediate member or rotatable member, wherein the structural member is engaged with the intermediate member by an engagement portion of the intermediate member which is received in an engagement recess of the intermediate member, the engagement recess of the intermediate member being closed on at least one face by at least one of a friction reducing member, a clip means or the rotatable member, wherein the structural member is retained by the intermediate member and the rotatable member, the clip means being provided for temporarily holding the structural member with respect to the rotatable member or intermediate member, during assembly.

2. A structure as claimed in claim 1, wherein the suction means is circular and of diameter up to 10 cm.

3. A structure as claimed in claim 1, wherein the suction means and rotatable member are each circular and of diameter up to 10 cm.

4. A structure according to claim 1, wherein at least part of the rotatable member extends beyond a part of the intermediate member which is adjacent to the rotatable member.

5. A structure having a mounting means for removable attachment to a substantially vertical surface, the mounting means comprising:
suction means for sealingly contacting a surface, pulling means being attached to the suction means for drawing a part of the suction means away from the surface so that a partial vacuum is created between the suction means and the surface, there being a substantially helical or wedge shaped surface engaged with a corresponding substantially helical or wedge shaped surface of a rotatable member, whereby rotation of the rotatable member draws the pulling means and respective part of the suction means away from the surface, and an intermediate member for engaging a sealing part of the suction means, the intermediate member supporting the rotatable member, wherein the structure comprises a structural member mounted in or on the intermediate member, at least part of the rotatable member extending beyond a part of the intermediate member which is adjacent to the rotatable member, in a dimension extending at a right angle to the axis of rotation of the rotatable member, wherein the intermediate member comprises an annular ridge for engaging a corresponding formation on the sealing part of the suction means.

6. A structure as claimed in claim 5, wherein the rotatable member comprises at least one bearing surface for sliding over the intermediate member.

7. A structure according to claim 5, wherein the bearing surface engages the intermediate member through a friction reducing member.

8. A structure according to claim 1, comprising a friction reducing member between the rotatable member and the intermediate member.

9. A structure according to claim 8, wherein the friction reducing member is releasably fixed to one of the rotatable member and the intermediate member.

10. A structure according to claim 1, wherein at least one of the rotatable member and intermediate member is made of metal.

11. A structure according to claim 1, wherein the rotatable member and the intermediate member contact one another through a bearing surface, the bearing surface being located at a position displaced radially inwardly from the outer rim of the rotatable member by at least 1 mm.

12. A structure according to claim 1, wherein the intermediate member and the rotatable member do not contact the surface, in use.

13. A structure according to claim 1, wherein the structural member is engaged with the intermediate member by an engagement portion which is received in an engagement recess of the intermediate member.

14. A mounting means for removable attachment to a substantially vertical surface, comprising:
suction means for sealingly contacting a surface, pulling means being attached to the suction means for drawing a part of the suction means away from the surface so that a partial vacuum is created between the suction means and the surface, the pulling means comprising a substantially helical or wedge shaped surface engaged with a corresponding substantially helical or wedge shape surface of a rotatable member, whereby rotation of the rotatable member draws the pulling means and respective part of the suction means away from the surface, and an intermediate member, for engaging the sealing part of the suction means, the intermediate member supporting the rotatable member, wherein the rotatable member comprises at least one bearing surface for sliding over the intermediate member and the bearing surface engages the intermediate member through a friction-reducing member, wherein the friction-reducing member is fixed to the intermediate member or fixed to the rotatable member.

15. A structure having a mounting means for removable attachment to a substantially vertical surface, wherein the mounting means comprises:
suction means for sealingly contacting a surface, pulling means being attached to the suction means for drawing a part of the suction means away from the surface, so that a partial vacuum is created between the suction means and the surface, there being a substantially helical or wedge shaped surface engaged with a corresponding substantially helical or wedge shaped surface of a rotatable member, whereby rotation of the rotatable member draws the pulling means and respective parts of the suction means away from the surface, and an intermediate member for engaging a sealing part of the suction means, the intermediate member supporting the rotatable member, wherein the structure comprises a structural member mounted in or on the intermediate member, so that the structural member is not gripped by the intermediate member or rotatable member, wherein the structural member is engaged with the intermediate member by an engagement portion of the intermediate member which is received in an engagement recess of the intermediate member, the engagement recess of the intermediate member being closed on at least one face by at least one of a friction reducing member, a clip means or the rotatable member, wherein the intermediate member comprises an annular ridge for engaging a corresponding formation on the sealing part of the suction means.

16. A structure according to claim 14, wherein resilient structures are formed on at least one of the friction reducing member and the member to which it is fixed.

17. A structure according to claim 14, wherein the intermediate member comprises an annular ridge for engaging a corresponding formation on the sealing part of the suction means.

18. A mounting means for removable attachment to a substantially vertical surface, comprising:
suction means for sealingly contacting a surface, pulling means being attached to the suction means for drawing a part of the suction means away from the surface so that a partial vacuum is created between the suction means and the surface, the pulling means comprising a substantially helical or wedge shaped surface engaged with a corresponding substantially helical or wedge shape surface of a rotatable member, whereby rotation of the rotatable member draws the pulling means and respective part of the suction means away from the surface, and an intermediate member, for engaging the sealing part of the suction means, the intermediate member supporting the rotatable member, wherein the rotatable member comprises at least one bearing surface for sliding over the intermediate member and the bearing surface engages the intermediate member through a friction-reducing member, wherein the intermediate member comprises an annular ridge for engaging a corresponding formation on the sealing part of the suction means.

* * * * *